United States Patent
Issaa et al.

(10) Patent No.: US 6,813,340 B1
(45) Date of Patent: Nov. 2, 2004

(54) RINGING SLIC FAULT HANDLING

(75) Inventors: Michael Issaa, Campbell, CA (US); Steven Chow, San Carlos, CA (US)

(73) Assignee: Cisco Technology, Inc., San Jose, CA (US)

( * ) Notice: Subject to any disclaimer, the term of this patent is extended or adjusted under 35 U.S.C. 154(b) by 724 days.

(21) Appl. No.: 09/723,678

(22) Filed: Nov. 28, 2000

(51) Int. Cl.[7] .......................... H04M 1/24; H04M 3/08; H04M 3/22; H04M 1/00

(52) U.S. Cl. ..................... 379/31; 379/22; 379/22.03; 379/24; 379/27.01; 379/377; 379/395.01; 379/399.01; 379/413; 379/413.01

(58) Field of Search ................ 379/31, 22, 22.03, 379/377, 378, 394, 398, 399.01, 399.02, 403, 412, 413, 413.01, 413.02, 418, 419, 24, 27.01, 27.06, 29.03, 29.04, 395.01

(56) References Cited

U.S. PATENT DOCUMENTS

| | | | | |
|---|---|---|---|---|
| 5,138,658 A | * | 8/1992 | Carter et al. ................ | 379/413 |
| 5,228,081 A | * | 7/1993 | Warner et al. ......... | 379/399.02 |
| 5,323,460 A | * | 6/1994 | Warner et al. ......... | 379/399.01 |
| 5,329,585 A | * | 7/1994 | Susak et al. ........... | 379/399.01 |
| 5,619,567 A | * | 4/1997 | Apfel ......................... | 379/413 |
| 5,636,274 A | * | 6/1997 | Youngblood ................ | 379/413 |
| 5,764,755 A | * | 6/1998 | Chen ..................... | 379/413.01 |
| 5,872,842 A | * | 2/1999 | Daly et al. ............. | 379/399.01 |
| 5,926,544 A | * | 7/1999 | Zhou ......................... | 379/413 |
| 5,960,075 A | * | 9/1999 | Sutherland et al. .... | 379/413.01 |
| 6,137,189 A | * | 10/2000 | Youngblood ................. | 307/30 |
| 6,480,603 B1 | * | 11/2002 | Meier ........................ | 379/413 |
| 6,690,792 B1 | * | 2/2004 | Robinson et al. ........... | 379/418 |

* cited by examiner

Primary Examiner—Quoc Tran
(74) Attorney, Agent, or Firm—Campbell Stephenson Ascolese, LLP

(57) ABSTRACT

A line card or other telephone or communications interface provided with a ringing SLIC outputs relatively high voltage, such as in excess of about 90 volts, and/or relatively high current such as in excess of about 20 milliamps during normal use, but decreases the voltage or current of a ringing signal or other signal upon occurrence of a tip and/or ring line fault or other abnormal condition. The abnormal condition is detected by measuring voltage and/or current on the tip line and/or ring line. In response to an excess voltage or current, the ringing current or other output current is reduced to achieve desired safety and/or compliance with standards.

22 Claims, 3 Drawing Sheets

RINGING SLIC FAULT HANDLING

The present invention relates to a system, method and apparatus for handling tip/ring faults in a ringing SLIC and in particular for providing desired safety features following a fault, while achieving increased loop length and/or supporting a high ringer equivalent number (REN) load.

BACKGROUND INFORMATION

In older telephone systems, users' telephone units were coupled to a telephone exchange by transformers or similar devices. In current telephone systems, it has become common to provide coupling to an exchange by a system which includes a "line card", commonly having a subscriber line interface circuit (SLIC). A number of different types of SLIC devices are in use. In some configurations, the line card includes a ring-voltage source (for ringing subscriber units which are on the "loop") which is separate from the SLIC. However, in a "ringing SLIC", the ringer voltage source is integrated within the same silicon/IC package as the SLIC.

In general, it is desired to provide telephone systems and equipment which can substantially assure the safety of users, technicians and the like. Many governmental or private organizations have established requirements or guidelines which help assure various safety standards. One common safety standard relates to the maximum voltage (or, in some cases, current) present on a tip or ring line, e.g., of a "plain old telephone service" (POTS) line, after a single fault has occurred on either the tip or ring line. Among the standards directed to this safety feature are underwriters laboratories (UL) 1950 and Canadian Standards Association (CSA) C22.2 No. 950 (incorporated herein by reference). While standards relating to maximum voltage after a single fault may vary slightly from country to country and/or may be revised over time, in general, it is the consensus that safety, in this regard, (and compliance with most standards) is assured if, following a single fault, current on the tip or ring line does not exceed about 20 milliamps. A general purpose of the standard is to assure safety of humans who may come in contact with the tip or ring line in those conditions. In general, it is reasonable to model the human body by a resistance of about 5 kilohms, leading to a general requirement that the voltage on the tip or ring line, after a single fault, should not exceed about 90 to 100 volts.

As noted above, in a ringing SLIC device, the ringer voltage source and the SLIC are integrated within the same Silicon/IC package. Although there may be some ringer SLIC devices which do not consistently comply with the maximum voltage/current standards, the previous approach to providing a line card which does comply was typically to provide or design a ringing SLIC which is incapable of outputting ringer voltage in excess of about 90 to 100 volts (at any time). Limiting the maximum ringer voltage in this manner places effective constraints on the ringer equivalent number (REN) load which can be supported and/or the loop "reach" that can be achieved, e.g. on a POTS line. For example, in some previous approaches, a ringing SLIC could not support more than about a three REN load. As described in Federal Communications Commission (FCC) regulation Part 6 8.313 (incorporated herein by reference), a REN can be affected by, among other things, the ringing frequency. Accordingly, it would be useful to provide a system, method and apparatus for making or using a ringing SLIC which can provide the required or desired safety standards while supporting an increased REN load and/or a longer loop reach.

In addition to safety standards, including those noted above, governments and private organizations have also developed system integrity and/or performance standards. For example, various standards may require that equipment coupled to tip and ring lines must not perturb certain electrical characteristics of the tip and ring lines outside certain tolerance parameters. For example, in some standards there are limits on the amount of impedance change which can be made by adding or coupling equipment to tip and ring lines.

Accordingly, it would be useful to provide a method, system and apparatus for assuring compliance with safety requirements or otherwise assuring user safety, without substantially perturbing electrical characteristics on the tip and ring lines.

SUMMARY OF THE INVENTION

The present invention includes a recognition of the existence, nature and/or source of problems in previous approaches, including as described herein. In one aspect, a feedback system is provided to assure compliance with safety standards, or otherwise assuring safety, particularly after occurrence of at least a single fault on the tip or ring line, but which permits relatively high ringer voltage and/or current, in normal use, e.g. as long as there is no fault detected. In this way, relatively high voltages, such as greater than about 80 volts, more preferably greater than 90 volts, and even more preferably greater than 100 volts, can be provided during normal operation but, in the event of detection of a fault on the tip or ring line, the amount of voltage can be reduced so as to assure compliance with safety standards or otherwise assure safety of users. Preferably, monitoring or "snooping" of the tip and ring lines is done in a manner such that there is little real effect on the electrical characteristics on the tip and the ring line, such as by measuring voltage and/or current on the tip and ring lines.

The system can be configured in a number of ways to provide an appropriate response to an excess of voltage or current on the tip or ring lines. In one embodiment, a current and/or voltage sensor is provided external to the ringing SLIC and, in response to the detection of an excess of voltage or current on the tip or ring lines, a power supply is controlled to reduce the amount of power provided to one or more pins of the SLIC so as to effectively reduce the amount of voltage output as a ringer signal. In one embodiment, detection of excessive voltage or current on the tip or ring lines, and/or control or reduction of the ringer voltage, is performed internally in the ringer SLIC. Although it is possible to provide logic, used for making the appropriate response to tip/ring current or voltage magnitudes, internally to the line card and/or SLIC, it is also possible to use an external, e.g., general purpose, CPU ("system" CPU) for receiving indications of tip or ring current or voltage and outputting control signals so as to obtain the desired result.

In one aspect, a line card or other telephone or communications interface provided with a ringing SLIC outputs relatively high voltage, such as in excess of about 90 volts, and/or relatively high current such as in excess of about 20 milliamps during normal use, but decreases the voltage or current of a ringing signal or other signal upon occurrence of a tip and/or ring line fault or other abnormal condition. The abnormal condition is detected by measuring voltage and/or current on the tip line and/or ring line. In response to an excess voltage or current, the ringing current or other output current is reduced to achieve desired safety and/or compliance with standards.

DETAILED DESCRIPTION OF THE PREFERRED EMBODIMENTS

Figure 1:
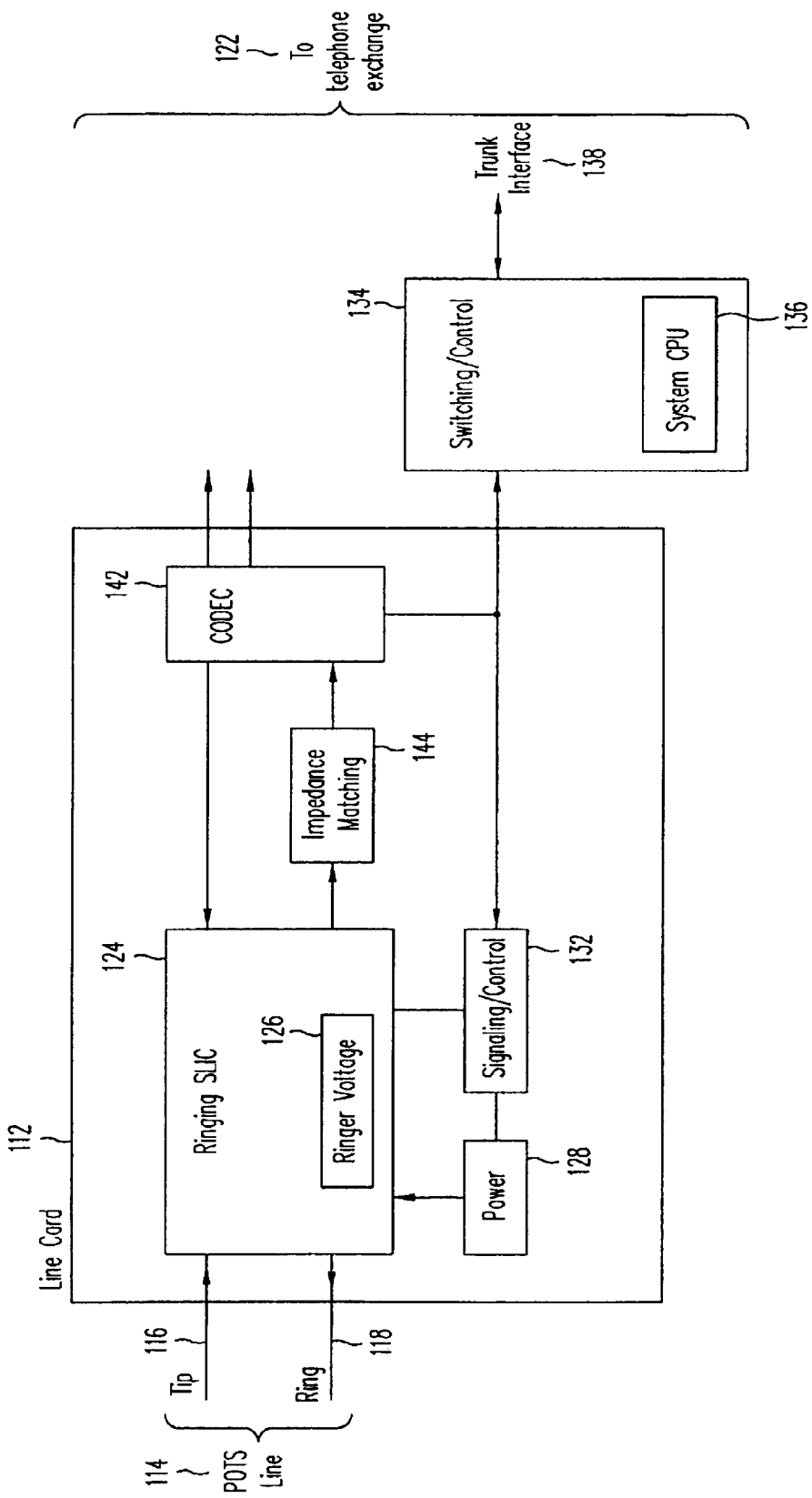
FIG. 1 is a simplified block diagram of a line card containing a ringing SLIC.

As depicted in FIG. 1, a line card 112 can be provided as an interface between a POTS line 114 (containing tip 116 and ring 118 lines) and a connection to a telephone exchange 122. Although the line card 112 is depicted in somewhat simplified fashion, it is believed to assist in explaining features of significance in the present invention. The line card 112 includes a ringing SLIC 124 which has a ringer voltage source or control 126. The design and operation of ringing SLICs according to previous approaches are well understood by those of skill in the art, and those of skill in the art will understand how to construct, select, use and/or modify a ringing SLIC for implementing embodiments of the present invention after understanding the present disclosure. Accordingly, details and/or components of the ringing SLIC are not illustrated. The ringing SLIC 124 is provided with power from a power supply 128 and receives signals and controls from signaling/control unit 132, coupled to a switching/control system 134, separate from a line card 112 typically containing a system central processing unit (CPU) 136. The switching control unit 134 is coupled to a telephone trunk interface 138. The ringing SLIC 124 is also coupled to a coder/decoder (CODEC) 142, typically with impedance matching 144.

In previous approaches, if a line card 112 and/or ringing SLIC 124 was configured to achieve compliance with safety regulations or otherwise to achieve desired safety, the ringing SLIC and/or line card were designed so as to be unable to output a ringing voltage in excess of a predetermined threshold, under any circumstances, including during normal voltage. For example, if it was desired to avoid outputting a voltage of more than about 90 volts after a single fault on a tip 116 or ring 118 lines, previous approaches typically provides a ringer voltage source 126 which was incapable of ever outputting a ringing voltage in excess of about 90 volts, even during normal use. Because of the constraints on ringing voltage in previous approaches, the line card 112, in previous approaches, typically was undesirably limited in the REN load that could be supported, such as supporting no more than about 3 REN. Furthermore, the line card 112, according to previous approaches, was typically undesirably limited in the reach of the loop, such as providing an effective loop "reach" of no more than about 1000 feet ("short loops").

According to one aspect of the present invention, a feedback system is provided for controlling or determining the magnitude of the ringing voltage and/or the tip/ring voltage or current. In the embodiment depicted in FIG. 2, the tip and ring lines are "snooped" by using a voltage sensor 212 and/or current sensor 214 for providing at least an indication of whether voltage or current on the tip line 116 or ring line 118 exceeds a (preferably predetermined) threshold. Preferably, the voltage sensor 212 and/or current sensor 214 are configured to substantially avoid changing or affecting the electrical characteristics on the tip line 116 or ring line 118, such that it will still meet the return loss specifications or "templates" set by the telecommunications carrier and those of skill in the art will understand how to construct voltage sensors 212 and/or current sensors 214 having this characteristic. In one embodiment, the voltage threshold is about 90 volts (e.g. with respect to the system ground voltage value). In one embodiment, the current threshold is about 20 milliamps. Those of skill in the art are familiar with construction of voltage sensors and/or current sensors and will understand how to select, construct and/or use a voltage sensor 212 and/or a current sensor 214 to sense or measure the amount of voltage or current on the tip line 116 and ring line 118. In one embodiment, the voltage sensors 212, 214 provide a substantially bi-stable output such that the output 224 has a first state when neither the tip line 116 nor the ring line 118 is in excess of a voltage and/or current threshold, and has a second state when either the tip line 116 or the ring line 118 exceeds a voltage threshold (if a voltage sensor 212 is used) and/or exceeds a current threshold (if a current sensor 214 is used). Providing a voltage sensor and/or current sensor 212, 214 with a substantially bi-stable output effectively forms a simple logic unit. It is also possible to provide a voltage sensor 212 or current sensor 214 with more elaborate logic. For example, it may be desired to control voltage only if the voltage or current on the tip/ring lines 116, 118 exceeds a threshold for a certain amount of time and/or by a certain magnitude. As will be understood by those of skill in the art, logic can be provided in a hard wired-fashion (e.g. using discrete components and/or using an application specific integrated circuit (ASIC)), in programmable fashion (e.g. using a programmable gate array or the like), or can be software-controlled (such as using a microprocessor or microcontroller in conjunction with a stored program).

Figure 2:
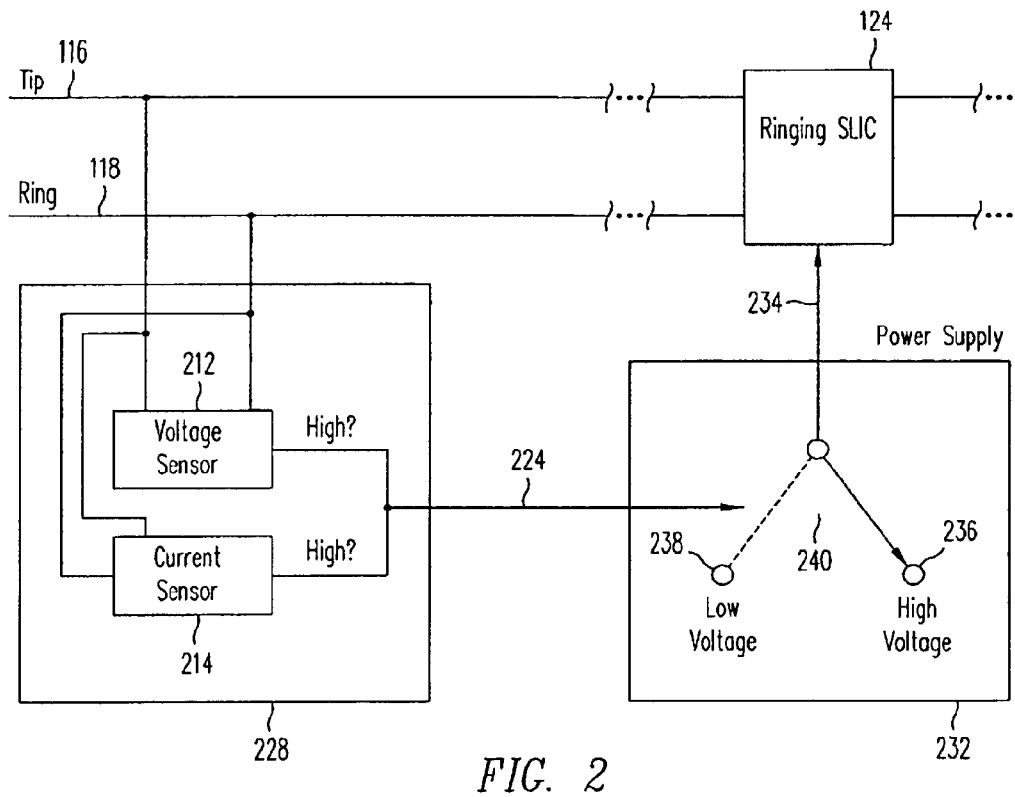
FIG. 2 is a block diagram of a device for handling tip/ring faults according to an embodiment of the present invention.

In the embodiment depicted in FIG. 2, the output 224 from the detector 228 is provided to a power supply 232. The power supply 232 outputs power 234 to the ringing SLIC 124 in such a manner that the amount of power provided 224 affects the ringing voltage and/or voltage on the tip 116 and/or ring 118 lines. In the embodiment depicted in FIG. 2, the power supply 232 can be switched between a high power or high voltage configuration 236 and a low voltage configuration 238. Although for simplicity FIG. 2 depicts the switch 240 as a mechanical relay, it is contemplated that solid state switching would typically be used. Those of skill in the art will understand how to provide solid state switching of a power supply in response to an input signal 224, after understanding the present disclosure. In one embodiment, the low voltage 238 is less than about 90 volts and the high voltage 236 is greater than about 90 volts, preferably greater than about 100 volts and even more preferably greater than about 150 volts (e.g. for long loop applications, 18,000 feet).

Although FIG. 2 illustrates a configuration in which the power supply 232 can switch between two discrete voltages 238, 236, it is possible to provide power supplies which can output more than two voltages, including power supplies which can output throughout a range of voltages.

Figure 3:
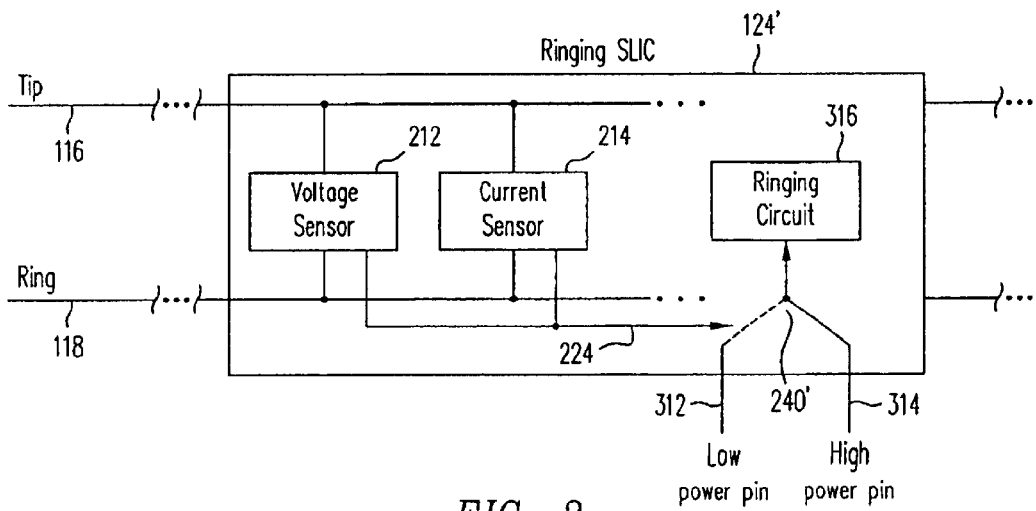
FIG. 3 is a block diagram of a device for handling tip/ring faults according to an embodiment of the present invention.

In the embodiment of FIG. 3, the sensors 212 and/or 214, as well as the switch 240 for changing effective ringing voltage are integrated into the ringing SLIC 124'. In the embodiment of FIG. 3, the ringing SLIC includes a low power pin 312 and a high power pin 314 for coupling respectively to a low power source (such as 90 volts or less) and high power source (such as greater than about 90 volts). It is also possible to provide an SLIC which has a single high power input and provide for step down or other voltage control, controlled by the output 224 of the sensor 212, 214. The embodiment of FIG. 2 can be advantageous in situations where it is economically or otherwise desirable to use existing ringing SLICs 124 (which are capable of outputting high-voltage or high current ringing or other signals). In this way, embodiments of the present invention can be implemented without the need for redesigning existing ringing SLICs. The embodiment of FIG. 3 can provide advantages of cost reduction in fabrication, installation, maintenance and the like, associated with integration of functions.

Figure 4:
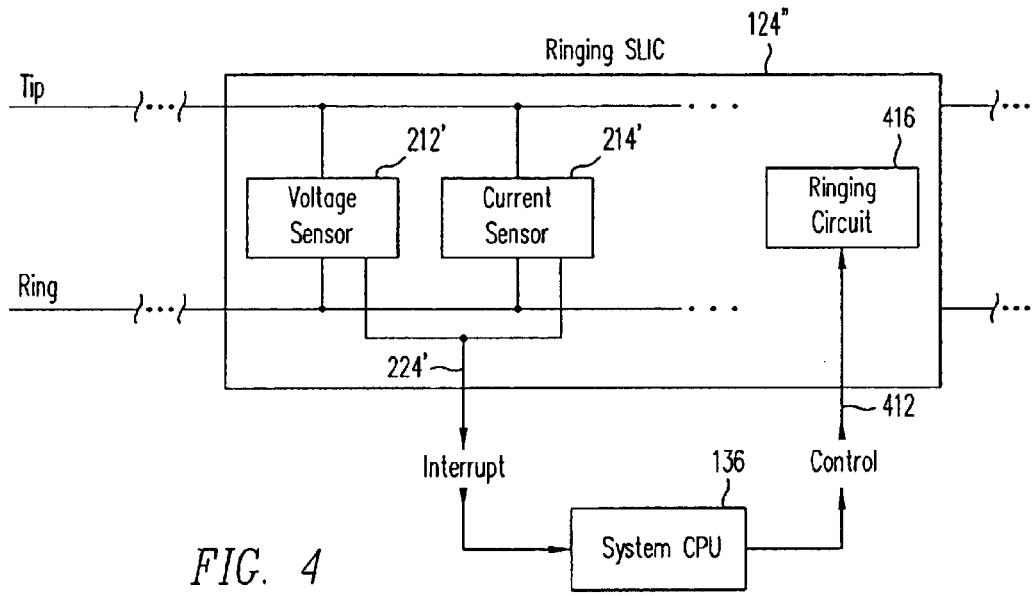
FIG. 4 is a block diagram of a device for handling tip/ring faults according to an embodiment of the present invention.

In the embodiment of FIG. 4, the output from the sensors 212', 214' do not directly control ringing voltage. Instead, a signal indicative of a tip/ring voltage or current which is in excess of a threshold 224' is provided as an interrupt or other input signal to logic positioned external to the SLIC 124", typically external to the line card 112, such as the system CPU 136. The system CPU 136 can then provide control signals, e.g., through one or more control pins 412 for controlling the amount of voltage output by the ringing circuit 416. When the system CPU 136 (or other logic) is controlled by stored programming, the system is, in general, advantageously flexible and can be configured to accommodate a variety of requirements or environments by changing programming. For example, if two different systems were to be configured so as to have different voltage or current thresholds, by using the system of FIG. 4, identical line cards 112 and/or ringing SLICs 124" could be used throughout, with the differing requirements being accommodated by making a programming change in the microcode controlling the system CPU 136.

Figure 5:
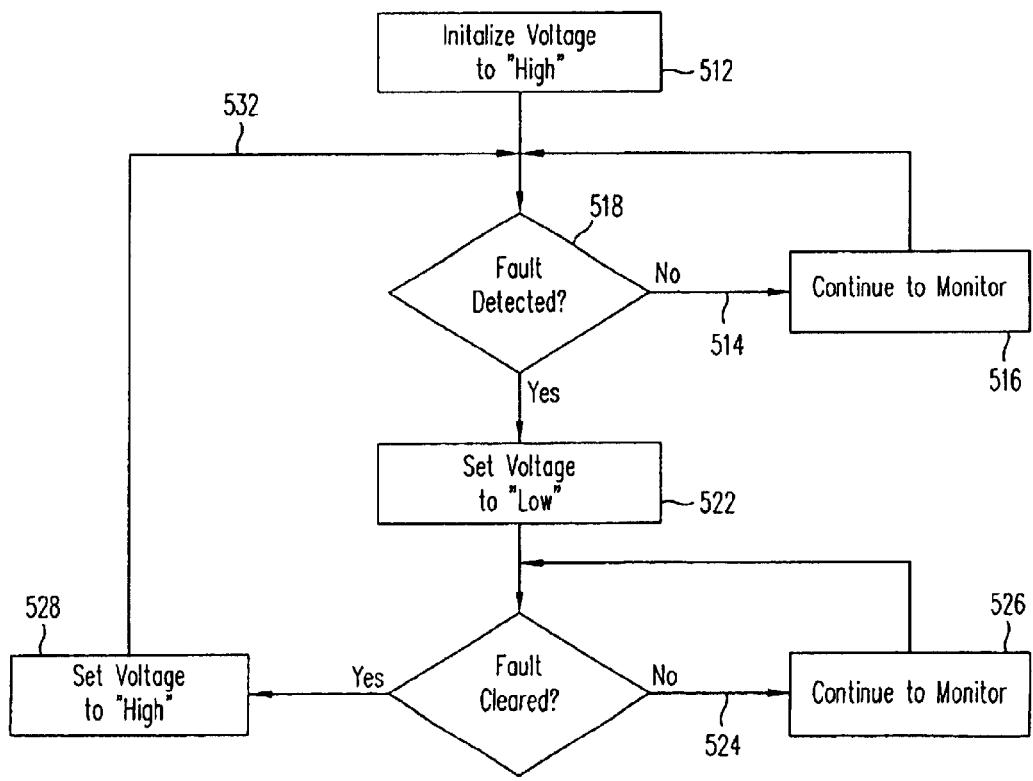
FIG. 5 is a flow diagram illustrating a procedure for handling faults according to an embodiment of the present invention.

In practice, as depicted in FIG. 5, the system can be initially implemented by setting the voltage control so as to output a desirably high voltage 512, e.g., to support a relatively large REN load and/or a large loop "reach", during normal use. As long as no fault is detected 514, the system merely continues to monitor the voltage and/or current on the tip and ring lines 516. If however a excess voltage and/or excess current (i.e., exceeding voltage or current thresholds, which may be predetermined, fixed and/or variable), indicative of a tip/ring fault 518, the system responds by setting the voltage to a low value 522. For example, in FIG. 2, the signal 224 controls the switch 240 to the low voltage 238 configuration. In the embodiment of FIG. 3, the output signal 224 configures the switch 240' to provide power from the low power pin 312 to the ringing circuit 316. In the embodiment of FIG. 4, the output signal 224 provides an interrupt system CPU 136 which outputs a control signal to the control pin 412 of the ringing SLIC so as to configure the ringing circuit 412 to output a lower voltage. After the voltage has been set to a low value 522, the voltage and/or current continues to be monitored, to determine whether a fault has been cleared. If not cleared 524, monitoring continues 526. Once the fault has been cleared, the voltage is reset to a high value 528 and the system loops 532 to continue monitoring for faults.

In light of the above description, a number of advantages of the present invention can be seen. The present invention makes it feasible to provide high voltage to a ringer, e.g., to allow a POTS line to support higher REN loads and/or a longer loop reach, while still providing adequate or desired safety, preferably providing compliance with standards such as UL 1950 and/or CSA C22.2 No. 950. The present invention makes it possible to achieve high REN loads and/or longer loop reach while avoiding substantial perturbations of electrical characteristics on the tip and/or ring lines. The present system provides for substantial safety of users, technicians and the like while still achieving desired high REN loads such as greater than 3, preferably greater than 4 and even more preferably greater than 5 REN.

A number of variations and modifications of the invention can be used. It is possible to use some features of the invention without using others. For example, it is possible to snoop the tip and ring lines for excessive voltage and/or current without controlling output of a discrete power supply provided to a ringing SLIC. Although embodiments have been disclosed in which, in response to excessive tip/ring current or voltage, the ring voltage is reduced, it is also possible to respond to excessive voltage or current by completely interrupting the tip or ring voltage until the fault is cleared. Although the system preferably includes automatically determining fault clearance and restoring to a high voltage configuration, it is also possible to provide embodiments in which fault clearing is detected manually and/or return to high voltage is performed manually. Although the invention was described in the context of a POTS, some or all aspects of the present invention can also be used in connection with other telephone or telecommunications systems or configurations. Although FIGS. 2–4 depict both a voltage sensor and a current sensor, embodiments of the present invention can be implemented using only a voltage sensor or using only a current sensor. It is also possible to provide embodiments in which two or more voltage sensors and/or two or more current sensors are provided, such as by providing a first voltage sensor for sensing voltage on the tip line 116 and the second voltage sensor for sensing voltage on the ring line 118.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g. for improving performance, achieving ease and\or reducing cost of implementation. The present invention includes items which are novel, and terminology adapted from previous and/or analogous technologies, for convenience in describing novel items or processes, do not necessarily retain all aspects of conventional usage of such terminology.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. Apparatus for controlling voltage in a ringing SLIC coupled to a tip line and ring line, comprising:
   a measurement device which measures at least a first electrical parameter of at least one of said tip line and said ring line and outputs at least a first signal if said electrical parameter exceeds a threshold value; and
   a voltage selector which selects between a first, low voltage and a second higher voltage as a ringer voltage value in response to the absence or presence of said first signal.

2. An apparatus, as claimed in claim 1, wherein said first electrical parameter is current.

3. An apparatus, as claimed in claim 2, wherein said threshold value is about 20 milliamps.

4. An apparatus, as claimed in claim 1, wherein said electrical parameter is voltage.

5. An apparatus, as claimed in claim 4, wherein said threshold value is about 90 volts.

6. An apparatus, as claimed in claim 1, wherein said measuring device changes impedance on said one of said tip and ring lines by no more than about 20 dB return loss.

7. An apparatus, as claimed in claim 1, wherein said first voltage is less than about 90 volts.

8. An apparatus, as claimed in claim 1, wherein said second voltage is greater than about 71 volts.

9. An apparatus for handling tip/ring defaults in a telephone system having a ringing SLIC coupled to tip line and a ring line comprising:
   means, coupled to at least one of said tip line and said ring line, for measuring at least one of a voltage or a current on one of said tip line and ring line;
   means, coupled to said means for measuring, for outputting a first signal when said means for measuring indicates a value in excess of a threshold value; and
   means, responsive to said first signal, for reducing ringing voltage output from said ringing SLIC, from a first value to a second value.

10. An apparatus, as claimed in claim 9, wherein said means for outputting is substantially included in said ringing SLIC.

11. An apparatus, as claimed in claim 9, wherein said means for outputting includes at least a first microprocessor separate and distinct from said ringing SLIC.

12. A method for handling tip/ring defaults in a telephone system having a ringing SLIC coupled to tip line and a ring line comprising:
   measuring a value of at least a first electrical parameter on one of said tip line and ring line;
   outputting a first signal when said step of measuring indicates a value in excess of a threshold value; and
   reducing ringing voltage output from said ringing SLIC, from a first value to a second value in response to said first signal.

13. A method, as claimed in claim 12, wherein said first electrical parameter is current.

14. A method, as claimed in claim 13, wherein said threshold value is about 20 milliamps.

15. A method, as claimed in claim 12, wherein said electrical parameter is voltage.

16. A method, as claimed in claim 14, wherein said threshold value is about 90 volts.

17. A method, as claimed in claim 12, wherein said step of measuring, changes impedance between tip and ring by no more than an amount which will still ensure minimum return loss of about 20 dB or higher.

18. A method, as claimed in claim 12, wherein said first voltage is less than about 90 volts.

19. A method, as claimed in claim 12, wherein said second voltage is greater than about 71 volts.

20. A method, as claimed in claim 12, further comprising outputting at least a second signal when said step of measuring indicates a value below a second threshold value.

21. A method, as claimed in claim 20, further comprising switching between said second higher voltage and said first, low voltage as a ringer voltage value, in response to the absence or presence of said second signal.

22. A method, as claimed in claim 20, wherein said second threshold value is substantially equal to said first threshold value.

* * * * *